United States Patent [19]

Coon et al.

[11] Patent Number: 5,567,864
[45] Date of Patent: Oct. 22, 1996

[54] METHOD AND APPARATUS FOR CALIBRATION OF A TRANSDUCER FLYING HEIGHT MEASUREMENT INSTRUMENT

[75] Inventors: Warren P. Coon, Poway; Stuart C. Watkins; Charles M. Kropp, both of San Diego, all of Calif.

[73] Assignee: Sunward Technologies, Inc., San Diego, Calif.

[21] Appl. No.: 263,999

[22] Filed: Jun. 22, 1994

Related U.S. Application Data

[63] Continuation-in-part of Ser. No. 412,036, Apr. 12, 1995, which is a continuation of Ser. No. 13,682, Feb. 4, 1993, abandoned.

[51] Int. Cl.⁶ .................................................. G01B 21/30
[52] U.S. Cl. .................................................. 73/1 J
[58] Field of Search ........................... 73/1 J; 360/103; 356/243

[56] References Cited

U.S. PATENT DOCUMENTS

| | | | |
|---|---|---|---|
| 4,605,977 | 8/1986 | Matthews | 360/103 |
| 4,624,564 | 11/1986 | Dahlgren | 356/243 |
| 5,021,906 | 6/1991 | Chang et al. | 360/103 |
| 5,079,657 | 1/1992 | Aronoff et al. | 360/103 |
| 5,097,368 | 3/1992 | Lemke et al. | 360/103 |
| 5,193,046 | 3/1993 | Lemke et al. | 360/97.02 |
| 5,220,408 | 6/1993 | Mager | 356/372 |
| 5,267,104 | 11/1993 | Albrecht et al. | 360/103 |
| 5,280,340 | 1/1994 | Lacey | 356/357 |
| 5,280,603 | 1/1994 | Jeppson et al. | 364/DIG. 1 |
| 5,285,337 | 2/1994 | Best et al. | 360/103 |
| 5,410,402 | 4/1995 | Li et al. | 356/243 |

FOREIGN PATENT DOCUMENTS

| | | |
|---|---|---|
| 16303 | 1/1982 | Japan . |
| 242561 | 12/1985 | Japan . |
| 5919 | 1/1991 | Japan . |

*Primary Examiner*—Hezron E. Williams
*Assistant Examiner*—Daniel S. Larkin
*Attorney, Agent, or Firm*—Fish & Richardson P.C.

[57] ABSTRACT

A method and apparatus for calibrating a flying height measurement instrument that: (1) precisely determines the actual height of a recording head over a disk, (2) is inexpensive, (3) permits the head whose flying height is to be measured to be used during the calibration procedure, and (4) is nondestructive to the calibration apparatus. In addition, the present invention can be used to calibrate different flying height measurement instruments and is independently verifiable. During the inventive calibration process, a special calibration slider is positioned over a measurement disk of a flying height measurement instrument in place of a slider which normally flies over the measurement disk when the flying height of a slider is being measured. The calibration slider has at least one support structure of a known height. During calibration of the flying height measurement instrument, the calibration slider is supported by the support structure over the measurement disk, such that the calibration slider is spaced apart from the calibration disk by the height of the support structure. The spacing is then statically determined. The result of the static measurement is used to plot the relationship between the output of the instrument during a dynamic measurement and the actual height of the recording head.

13 Claims, 14 Drawing Sheets

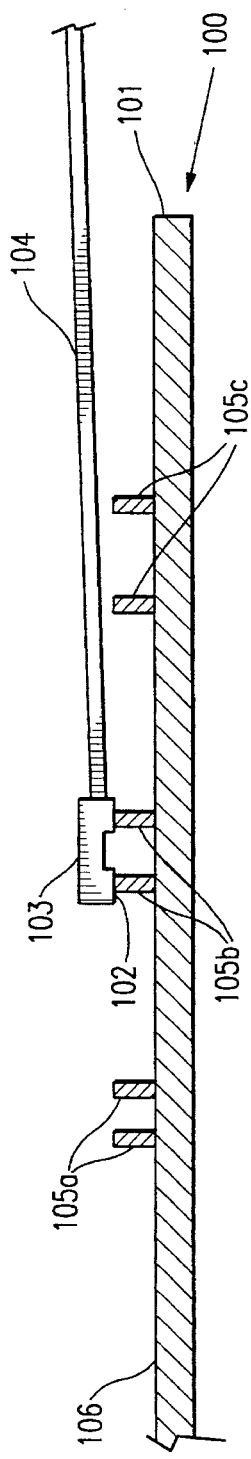
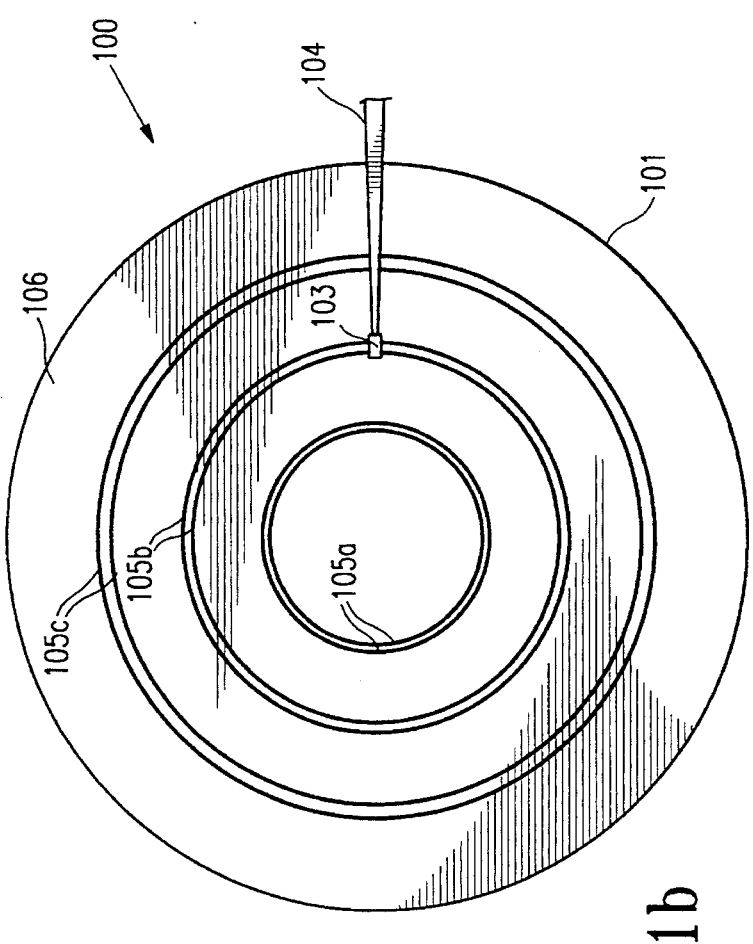
FIG. 1a
FIG. 1b 5,567,864

METHOD AND APPARATUS FOR CALIBRATION OF A TRANSDUCER FLYING HEIGHT MEASUREMENT INSTRUMENT

RELATED APPLICATIONS

The present application is a continuation-in-part of U.S. patent application Ser. No. 08/412,036, filed Apr. 12, 1995, which is a continuation of U.S. patent application Ser. No. 08/013,682, filed Feb. 4, 1993, now abandoned.

BACKGROUND OF THE INVENTION

1. Field of the Invention

This invention relates to test equipment used to measure the flying height of a read/write transducer of a computer disk drive storage device, and more particularly to a method and apparatus for calibrating an instrument which determines the flying height of a read/write transducer head over a rotating disk of a disk drive.

2. Description of Related Art

Disk drive devices are well established in the computer industry as a means for storing data. Disk drives include a rotating disk on which information is written and read by a "read/write" transducer head suspended over the rotating disk. It is common today to design the head of a disk drive such that, during operation, the head is suspended by an air cushion created by the relative motion of the disk with respect to the head. The cushion of air exerts an upward force on the head that permits the head to "fly" over the disk as the disk rotates underneath the head. Because the height at which a head flies over a disk is important to the operation of a disk drive, disk drive head manufacturers must be able to determine the "flyability" of the heads which they produce (i.e., the upward force exerted by the cushion of air that flows between the head and the disk), and the height to which that force will raise the head above the disk. Purchasers and manufacturers of disk drives often evaluate the performance of a disk drive based upon the flying height of the head over the disk during operation.

Presently, the three most widely used methods for determining the flying height of a head of a disk drive during operation are: (1) capacitance method; (2) optical interferometer method; and (3) laser Doppler vibrometer method. In each method, a head is flown over a rotating disk.

In the capacitance method, the distance between the head and the disk is determined during the flight of the head by applying the formula $C = E_o (A/d)$; where A is the area of a projection of the head onto the disk, projected in a direction perpendicular to the plane of the disk; $E_o$ is the dielectric constant of air; and d is the distance between the head and the disk. The dielectric constant of air is known, the area of the projection of the head onto the disk is easily determined, and the capacitance can be measured by a variety of well known methods. Thus, the distance d can be determined. When the capacitance method is used, a special head and disk are required to determine the capacitance between them.

In the optical interferometer method, variations of the fringe position or the intensity of the Newton's rings are used to determine the height of the head over the disk. For this method, a transparent head or disk is used.

The laser Doppler vibrometer method measures the velocity of the head by measuring the frequency shift of reflected light from a special vibrating test head.

Regardless of which of these three methods is chosen, the apparatus that is used to determine the flying height must be calibrated. Calibration of the apparatus identifies a correction factor which compensates for all variables in the process or apparatus, such as differences between the gain of different systems, variations in materials, etc. The correction factor is applied to the calculated flying height of each subsequently measured head to determine the actual flying height of each head. In order to calibrate the measurement instrument, the actual flying height of a head must be determined by a method that is independent of the measurement instrument. The need to know the actual flying height of a head prior to the calibration process presents an obvious dilemma; that is, how to determine the flying height of a head so that the apparatus that measures the flying height of a head can be calibrated.

Currently, the most widely used method to calibrate a flying height measurement instrument uses a disk having protrusions, or "bumps". The height of each bump can be measured to a very high degree of accuracy. The flying height of the head is measured by the method to be calibrated (e.g., the optical interferometer method). Then, the true flying height of the head is determined by passing the head over a bump disk. Contact between the head and a bump is detected by one of at least three methods: (1) electrical resistance technique, (2) acoustic emission technique, or (3) piezoelectric transducer (PZT) technique. The PZT technique is the most widely used of these methods. When the head comes into contact with a bump, a piezo-electric transducer (PZT) mounted on either the bump or the head generates an electric voltage. The level of the voltage produced is proportional to the velocity of the disk and the relative height of the head.

A problem with the PZT bump disk method and apparatus for calibrating a flying height measurement instrument is that factors other than the velocity of the head and the flying height of the head can also influence the output of the PZT. These factors include: the shape of the bump (in particular, the surface contour of the bump); the relative attitude of the head (i.e., position of each of three orthogonal axes through the head) relative to the bump; and the asperity of the air bearing surface of the head. These factors make the determination of the true flying height of the head imprecise. Similar problems arise when the acoustic emission method of detecting contact between the head and the bump is used. The electrical resistance method has a high sensitivity, accuracy, and repeatability. However, the electrical resistance technique requires a specially made head and disk. Therefore, the head used for calibration of the flying height measurement instrument is not the head whose flying height is to be measured. Therefore, differences between the characteristics of the calibration head and the head whose flying height is to be measured can affect the accuracy of the calibration.

Furthermore, since the bump method is destructive to the head, a special head must be used. Therefore, the flying height measurement instrument cannot be calibrated with the actual head whose flying height is to be measured. This means that even when the PZT technique is used, differences between the actual head to be measured and the calibration head may result in calibration errors.

Since the calibration procedure is imprecise, the true flying height of a transducer head cannot presently be precisely known. Therefore, while the present instruments for measuring flying height can be calibrated to yield the same result each time, they cannot be calibrated to agree with results from other manufacturers' instruments. To overcome this problem, some manufacturers presently establish an offset number or correlation number that is used to convert their results to agree with the results from other manufacturers' instruments. The value of the offset number depends upon the manufacturer of the head to which the head under test is to be compared.

Thus, the prior art means for calibrating a flying height measurement instrument has the following problems: (1) the output of the PZT method depends on the velocity, relative height, surface shape of the bumps, attitude of the head, and the asperity of the air bearing surface of the head, causing variations in the output of the PZT and thus calibration errors; (2) the prior art method of calibrating the flying height measurement instrument is destructive to the head used and to the bumps on the disk due to contact between the head and the bumps, hence the life of the calibration apparatus is limited and the cost of the calibration process is increased; (3) since this calibration process is destructive to the head, an actual head cannot be used during the calibration process, thus potentially introducing additional variables which may lead to calibration errors; (4) very tight control of the cleanliness, the shape, and the height of the bumps must be maintained.

Therefore, it would be desirable to have a method and apparatus for calibrating a flying height measurement instrument that: (1) precisely calibrates the flying height of a transducer head, as measured by a measurement instrument, to the actual flying height of the head, (2) is inexpensive, (3) permits a head whose flying height is to be measured to be used during the calibration procedure, and (4) is nondestructive to the calibration apparatus. The present invention provides such a method and apparatus.

SUMMARY OF THE INVENTION

The present invention is a method and apparatus for calibrating a flying height measurement instrument that: (1) precisely determines the actual height of a recording head over a disk, (2) is inexpensive, (3) permits the head whose flying height is to be measured to be used during the calibration procedure, and (4) is nondestructive to the calibration apparatus. In addition, the present invention can be used to calibrate different flying height measurement instruments and is independently verifiable.

During the inventive calibration process, a special calibration disk is mounted on a flying height measurement instrument in place of a disk over which the recording head normally flies when the flying height of the head is being measured. The calibration disk has at least one pair of concentric rails of a known height (preferably the height at which the head under test is expected to fly) which rise above the surface of the calibration disk. Each of the rails is substantially narrower than the width of a recording head whose flying height is to be measured, such that a substantial amount of the bottom surface of the head is exposed. The rails of each pair are spaced apart at a distance that is less than the width of a recording head. During calibration of the flying height measurement instrument, the recording head is suspended by a pair of rails over the calibration disk, such that the recording head is supported by each of the rails and is spaced apart from the calibration disk by the height of the rails.

The height of the rails is precisely measured by surface profile techniques. Thus, the spacing of the recording head above the calibration disk is very precisely known. The spacing is then statically determined (i.e., the calibration disk does not rotate) using the same technique that is to be employed when the flying height of the head is to be dynamically determined (i.e., when the recording head is flown over a rotating disk), such as by the well-known optical interferometer technique.

By controlling each of the variables of the static measurement during the calibration procedure, such that each static variable is identical to the corresponding dynamic variable, the result of the static measurement can be used to plot the relationship between the output of the dynamic measurement technique and the actual height of the recording head. If the nature of the characteristic curve of the dynamic measurement technique is known, then only one point on the curve is required to determine each other point on the curve. However, if the output curve requires greater definition, more than one static measurement may be required.

In an alternative embodiment to the present invention, a static flying height calibration slider flexure assembly ("calibration SFA") is used to calibrate a flying height measurement instrument. The calibration SFA includes a flexure and a calibration slider. The calibration slider is manufactured from the same material used to manufacture conventional sliders, the flying height of which is to be measured by the instrument to be calibrated. In the one embodiment of the present invention, a hard metal film is deposited at three discrete points on one surface of the calibration slider in a triangular pattern. The height of the metal film at the crest of each deposit is accurately determined by an independent apparatus (e.g., a surface profiler, such as a DEKTAK). The static flying height SFA has a gimbling spring to assure uniform contact with the high point of all three deposits of film when the static flying height SFA is brought into contact with a conventional glass disk of a conventional flying height measurement instrument. Since the height of the high point of each metal film spot can be known with relation to the surface of the calibration slider, the gap between the calibration slider and the glass disk can be precisely known. A measurement taken by the flying height measurement instrument can then be compared to the known gap between the calibration slider and the glass disk. The flying height measurement instrument can then be calibrated to adjust for discrepancies between the actual distance between the calibration slider and the glass disk and the measured height. As stated above, additional measurements may be required if the characteristic curve of the dynamic measurement technique is not known. Once the flying height of the calibration slider has been determined by the flying height measurement instrument, a conventional slider may be flown over the measurement disk. The flying height of the conventional slider may then be calibrated by applying to the measured height of the conventional slider, the offset: 1) between the measured distance from the calibration slider to the glass disk as measured by the flying height measurement instrument; and 2) the distance as measured by the independent apparatus.

There are several advantages to depositing film on the calibration slider rather than on the glass disk. Manufacture of a static flying height SFA is cheaper than manufacturing a calibration glass disk in accordance with the previously described embodiment of the present invention. Also, the distance between a calibration flying height slider and the glass disk of a flying height measurement instrument is measured using the same glass disk and flying height measurement instrument that is to be used in making an actual flying height measurement. No modifications need to be made to the flying height measurement instrument. The reading taken from the instrument is compared directly to the independently measured height from each of the three spots of metal deposited on the calibration slider. The height of each spot can be measured physically by an independent apparatus, such as a surface profiler. Using this method eliminates many variables that affect the normal flying height measurements, such as Z-height, gram load, part holder flatness, RPM, radius, skew angle, disk flatness, spindle run-out, temperature, air pressure, and humidity. In addition, the calibration SFA is transportable to other instruments. Therefore, flying height measurements taken by different flying height measurement instruments will be consistent and thus can be compared without the need for correction factors to compensate for differences between the instruments. Also, the slider body of the calibration SFA can be made from the same material as that used to make the parts to be measured. Using the same material eliminates reflectivity differences due to different materials. Still further, a calibration SFA in accordance with the present invention provides 3-point contact with the glass disk of the flying height measurement instrument that allows each point to register its true distance to the glass disk when the calibration SFA is gimbled. Testing is done with the disk stopped, so there is vitually no wear on the metallic spots of the calibration SFA. A major advantage of the calibration SFA of the present invention is that the calibration SFA is self-registering on the glass disk due to the gimbling of the calibration SFA. The use of a calibration SFA also better defines the area to be measured by a surface profiler. For example, when a calibration disk is used, a large continuous length of each rail must be profiled. Furthermore, metal deposited upon the glass disk is susceptible to contamination between lines of metal and the glass disk. Depositing the metal instead on the calibration slider in discrete spots is less susceptible to contamination between the metal film and the calibration slider.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1a is a side cross-sectional view of the inventive calibration disk with a transducer head shown supported by a pair of rails.

FIG. 1b is a top plan view of the inventive calibration disk of FIG. 1a, with a transducer head shown supported by a pair of rails.

Like reference numbers and designations in the various drawings refer to like elements.

DETAILED DESCRIPTION OF THE INVENTION

Figure 2:
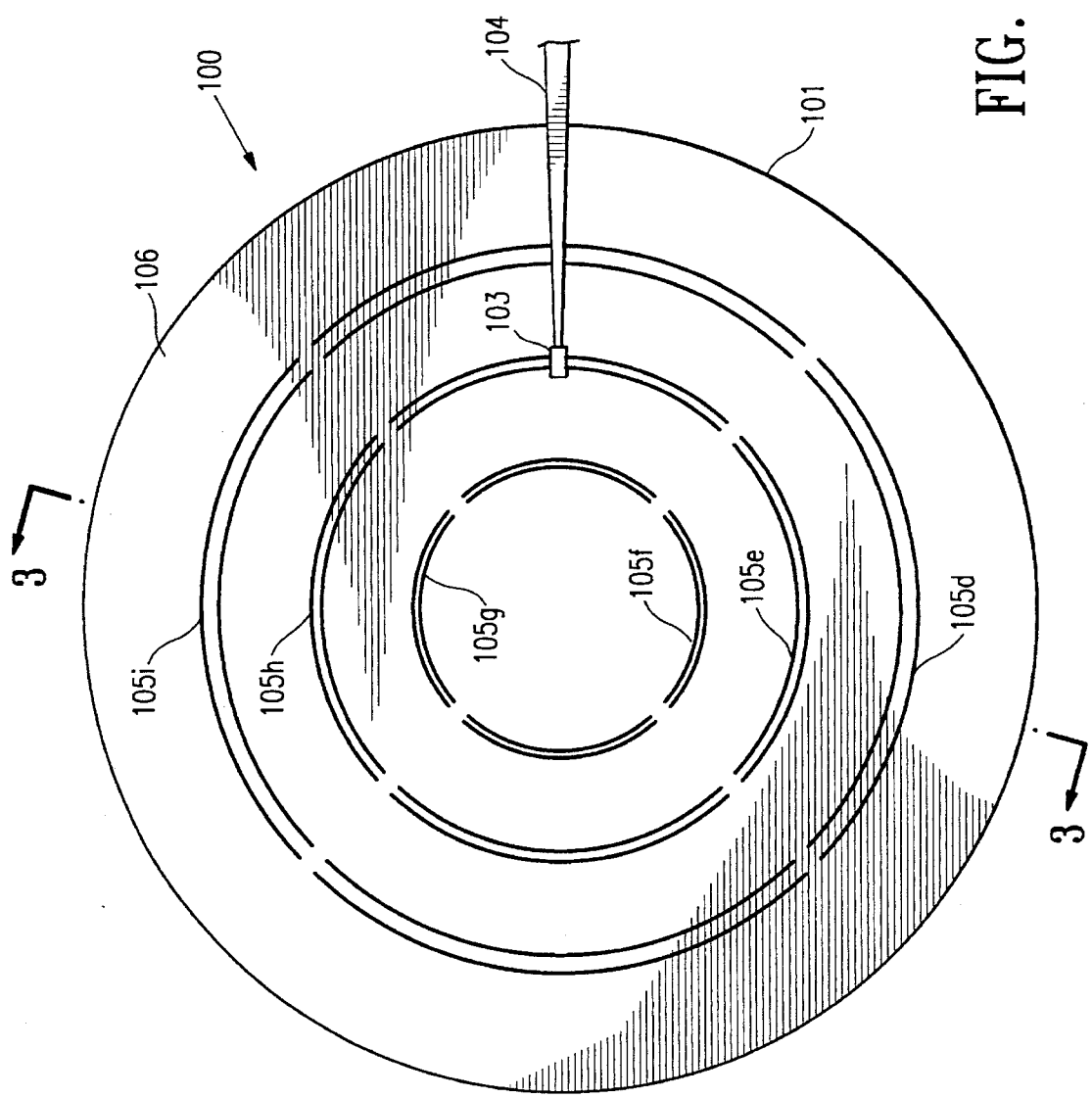
FIG. 2 is a top plan view of an alternative embodiment of the inventive calibration disk.

Throughout this description, the preferred embodiment and examples shown should be considered as exemplars, rather than as limitations on the present invention.

FIG. 1a is a side plan view of an inventive flying height calibration disk 100 with a transducer head 103 shown attached to an arm 104 and supported by support structures, such as a pair of rails 105 formed on the disk 100. The body 101 of the disk 100 is essentially similar to a prior art measurement disk used in a prior art flying height measuring instrument that is to be calibrated and above which the transducer head 103 flies when the measurement disk rotates. Thus, the disk may be made, for example, of glass. A dominant surface 106 of the illustrated calibration disk 100 is smooth. One or more pairs of concentric circular rails 105 are sputtered, or similarly deposited, upon the disk surface 106. In an alternative embodiment, identifying marks, such as numbers or letters may be inscribed or sputtered on the surface 106 of the disk 100.

Figure 3:
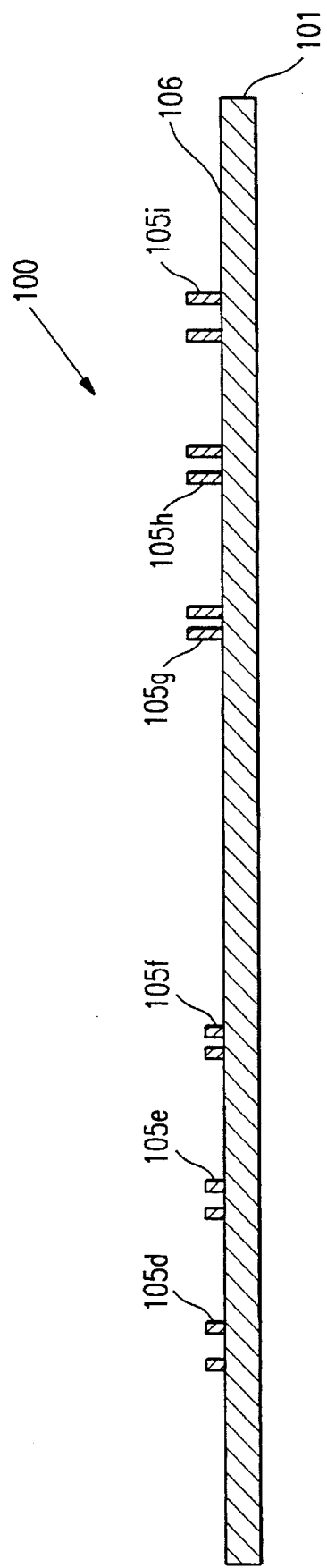
FIG. 3 is a cross-sectional view of the alternative embodiment of FIG. 2.

In an alternative embodiment, as shown in FIGS. 2 and 3, the rails 105 are formed as segments of concentric circles. A segment of each rail 105 of a pair of rails 105 is at least partially adjacent to and radially spaced apart from a corresponding segment of the other rail 105 of the pair. In yet another alternative embodiment, each pair of rails 105 may change height around the disk 100, such that rotating the calibration disk 100 changes the height of a transducer head over the surface 106. Thus, the height of the rails may vary intentionally to assist in achieving calibration over a predetermined height range.

Figure 4:
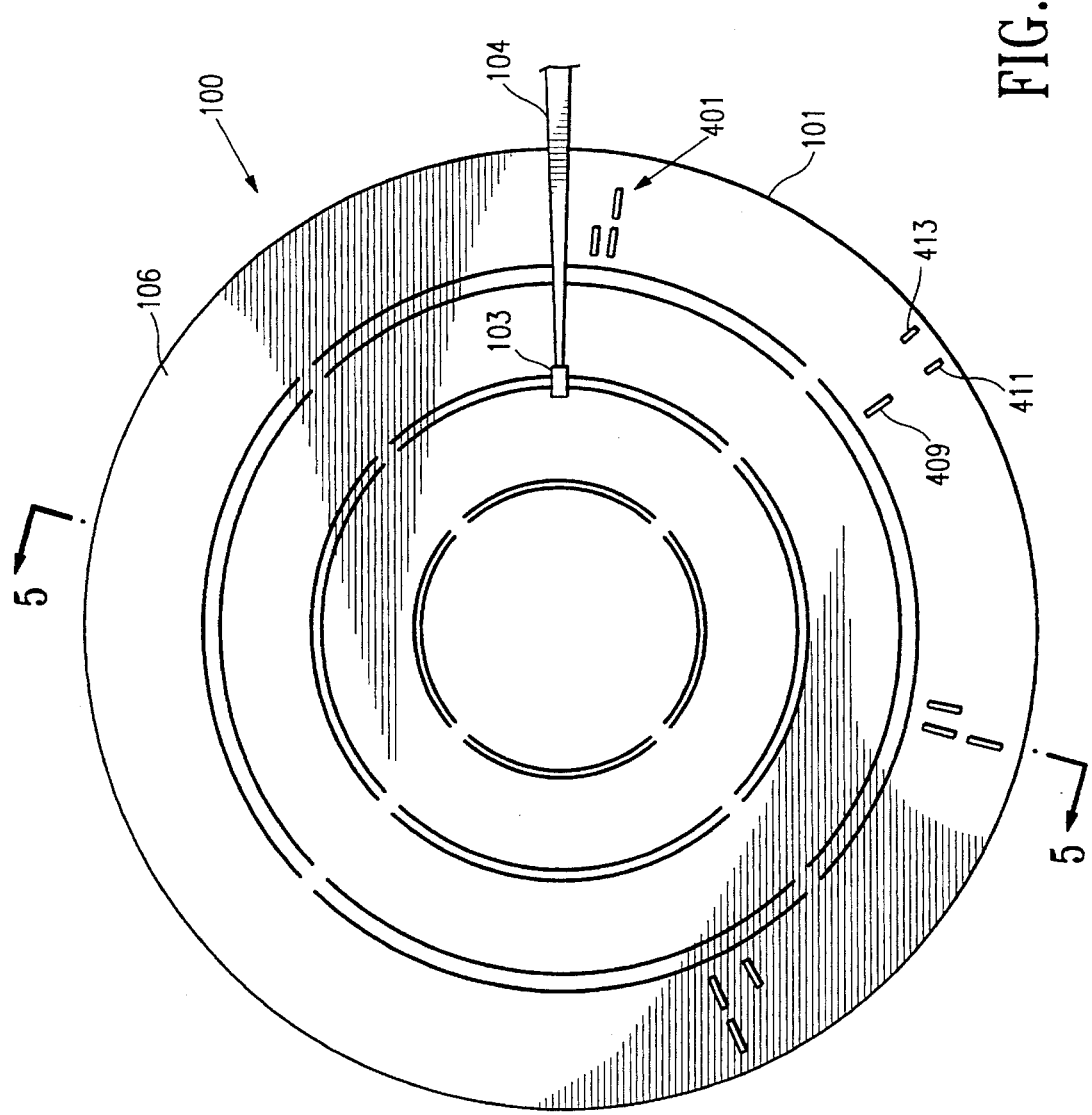
FIG. 4 is a top plan view of another alternative embodiment of the inventive calibration disk.
Figure 5:
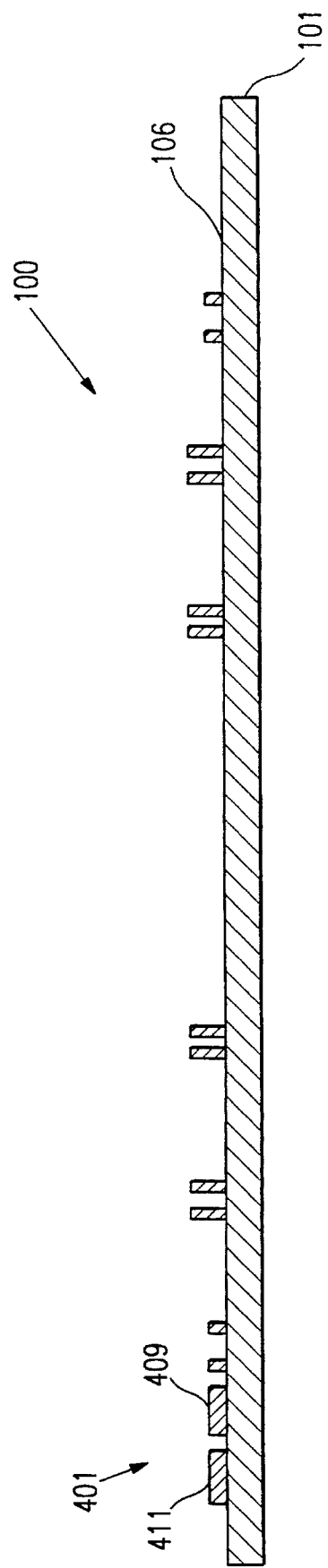
FIG. 5 is a cross-sectional view of the alternative embodiment of FIG. 4.
Figure 6:
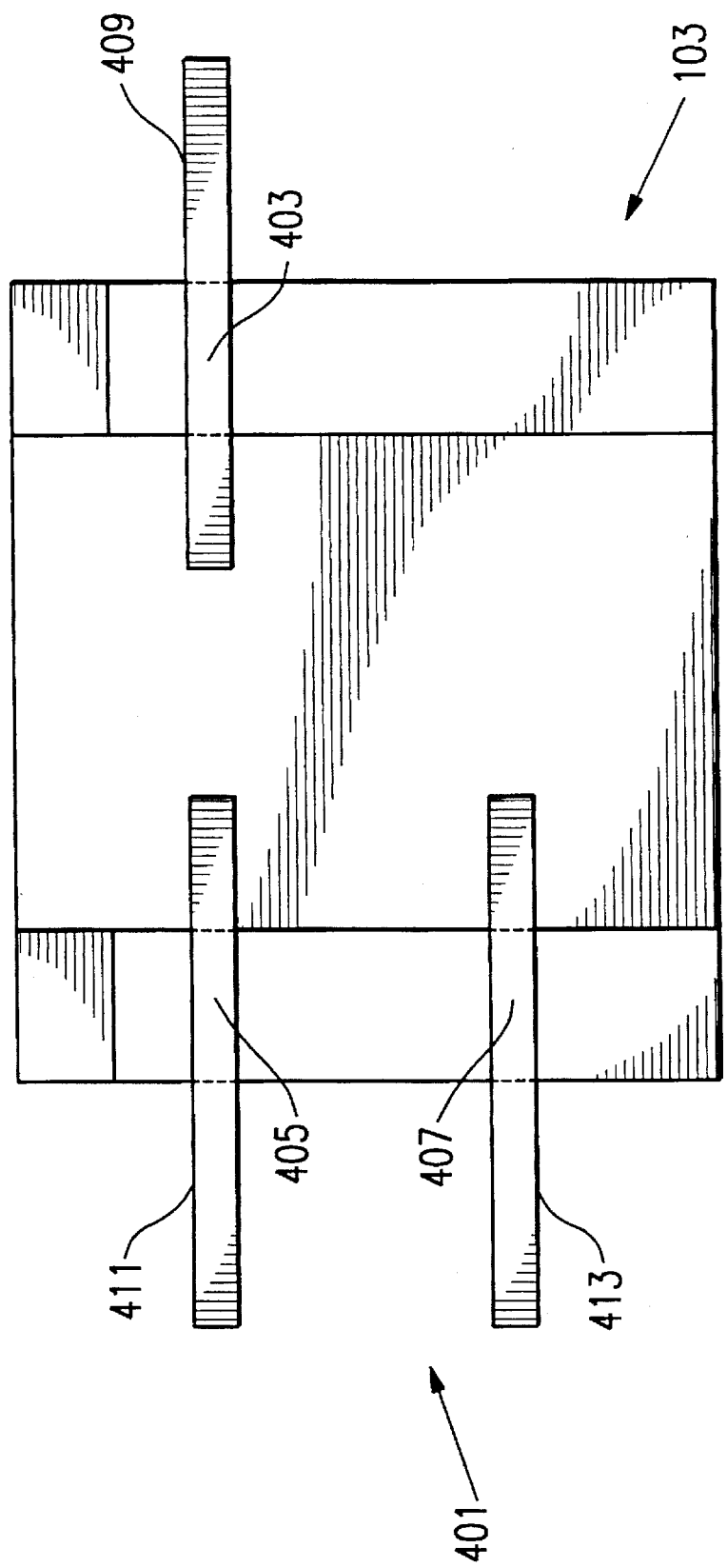
FIG. 6 is a view of a transducer head as seen through a clear calibration disk in accordance with the alternative embodiment of FIG. 4.

In yet another alternative embodiment of the present invention, as shown in FIGS. 4 and 5, a support structure 401 is fashioned as three spaced apart generally linear substructures 409, 411, 413, which contact a transducer head 103 at three points 403, 405, 407. FIG. 6 is a view of a transducer head 103 as seen through a transparent calibration disk on which such a pattern has been deposited. Two of the three substructures 409, 411 are coincident with a common radii of the calibration disk 100, while the third substructure 413 is coincident with a second radii of the calibration disk 100. Each substructure 409, 411, 413 of the support structure 401 is the same height as each other substructure 409, 411, 413 of the same support structure 401. Support structures 401 having this pattern provide stability for transducer heads 103 even when a transducer head 103 has a curved surface. The support structure 401 may be repeated across a surface of a calibration disk. Each such support structure 401 has different spacing to accommodate transducer heads 103 having different dimensions.

The variety of support structures that can be fashioned is too numerous to allow a complete list to be included within this document. However, the shapes and patterns described herein are intended to be illustrative of the concept. For example, the support structure may include a pair of support rails which are generally parallel and which spiral in toward the center of the calibration disk. The support structure may be a closed pattern, such as a four linear substructures, each of which intersect with two others, two of the four being parallel to one another and at right angles to each of the other two. The support structure may be a circular pattern. The support structure may be a generally transparent flat raised section formed upon the calibration disk. It should be quite clear that there are many variations of the patterns disclosed above which would fall within the scope of the invention.

The illustrated embodiment of FIG. 1b shows three pairs of rails 105. The rails 105 are preferably fabricated from sputtered chromium deposited on the surface 106 of the calibration disk 100, and are approximately 0.001 inches wide and with a height or thickness equal to the desired slider to disk separation, which is typically about 4.0 microinches or less. Of course, other dimensions may be used, as desired. Each rail 105 is substantially narrower than a head which is to be supported thereon (a head typically being 0.010 to 0.015 inches), such that a substantial portion of the bottom surface 102 of the head 103 is exposed. In the illustrated embodiment of FIG. 1b, the spacing between the rails 105 of each of the three pairs differs to accommodate heads 103 of various dimensions. In the illustrated embodiment, the inner most pair of rails 105a of the illustrated embodiment are spaced approximately 0.040 inches apart, the center pair of rails 105b are spaced approximately 0.068 inches apart, and the outer most pair of rails 105c are spaced approximately 0.092 inches apart. Of course, other spacings may be fabricated, as desired. The height of each rail 105 is measured by a surface profiling means, thus providing accurate information regarding such height.

To use the invention, the conventional measurement disk is removed from a flying height measurement instrument which is to be calibrated. The inventive calibration disk 100 is installed in the flying height measuring instrument in place of the conventional measurement disk and in the same manner that such a conventional measurement disk would be installed. However, the inventive calibration disk 100 does not rotate in use. Instead, the transducer head 103, the flying height of which is to be measured, is lowered onto a selected pair of rails 105, matched to the dimensions of the head 103. The transducer head 103 is supported by the rails 105 above the surface 106 of the calibration disk 100 a distance equal to the height of the pair of rails 105. The spacing between the surface 106 of the calibration disk and the transducer head 103 is then statically determined (i.e., without movement of the disk 100) using the same technique that is employed when the flying height of a head 103 is to be dynamically determined (i.e., when a transducer head 103 is flown over a rotating measurement disk), such as by the well-known optical interferometer technique.

Figure 7:
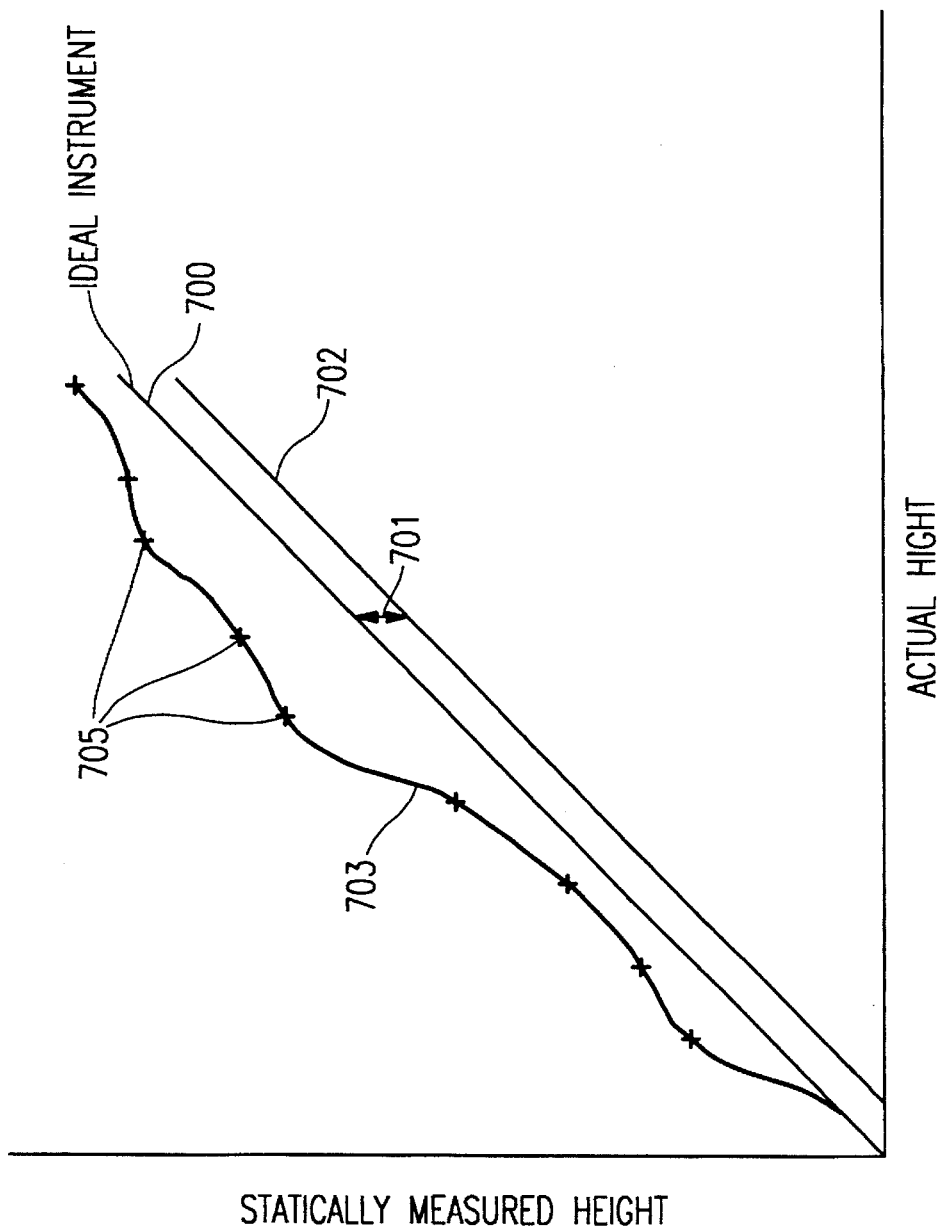
FIG. 7 is a graph of the statically measured height of a transducer head over the inventive calibration disk as measured by a flying height measurement instrument versus the actual height of the same transducer head.

FIG. 7 is a graph of the statically measured height versus the actual height of a head 103 over a calibration disk 100. A line 700 represents the output of an ideal instrument (i.e., an instrument in which the statically measured height is identical to the actual height). Comparing the output of the flying height measurement instrument with the known distance (or distances) between the head 103 and the calibration disk 100, yields an offset value 701 which defines a straight line offset 702 or a mapping 703 of the output of the flying height measurement instrument versus the actual height. The offset line 702 or map 703 thus generated calibrates the flying height measurement instrument. For example, if the actual height of the rails 105 is known to be 4.0 microinches, and the static measurement indicates that the head 103 is 3.8 microinches from the surface of the calibration disk 100, the offset 701 of 0.2 microinches is applied to the output of the flying height measurement instrument output during dynamic measurements to correct the output and thus yield the correct actual height.

In the case in which a plurality of static measurements 705 are made, the resulting map 703 is used to cross-reference the output of the instrument to an actual height. If the nature of the characteristic curve of the dynamic measurement technique is known (i.e., if determining the offset at one height provides sufficient information regarding the offset at each other height of interest), then only one height is required to determine the true height from the result of the dynamic measurement. In this case, the offset calibration technique may be used. However, if the output curve requires greater definition, more than one static measurement 705 may be required. When the output curve requires greater definition, the mapping calibration technique may be used.

In accordance with the mapping technique, the static height is measured at a plurality of heights 705. The difference between the statically measured height and the known height of the rail 105 is plotted, as shown in FIG. 7. Thus, if the map 703 is known, then the actual height can be calculated by finding the position on the map 703 and correlating the value of the statically measured height to the actual height. It should be apparent that the more complex the shape of the map 703, the more heights 705 will have to be statically measured to gain an accurate correlation between the statically measured height and the actual height.

Variables related to differences in the calibration disk 100 and the conventional measurement disk, such as differences between the refractive index of the calibration disk 100 and the measurement disk, are known. Therefore, any differences between the calibration disk 100 and the measurement disk can be accounted for when dynamically measuring the flying height of a head 103.

Once the height of the transducer head is measured at each height of interest, the transducer head 103 is then lifted from the rails 105 of the calibration disk 100 and the calibration disk 100 is removed from the flying height measurement instrument. A conventional flying height measurement disk is then installed in the flying height measurement instrument. The transducer head 103 is lowered onto the flying height measurement disk and the measurement disk begins rotating to lift the transducer head 103. The flying height may then be dynamically determined using the technique that was employed to determine the distance between the surface 106 of the calibration disk 100 and the transducer head 103 when the calibration disk 100 was installed. (Alternatively, the dynamic measurement may be performed before the static measurement). Any difference in the static output and the dynamic output of the flying height measurement instrument is due to a corresponding difference between the actual height of the free flying head 103 and the height of the statically measured head 103.

Since the calibration disk 100 is removable, it can be used to calibrate any number of flying height measurement instruments that use similar measurement disks. By installing a calibration disk 100 in one instrument, calibrating that instrument, and then removing the calibration disk 100 and installing the calibration disk 100 in another instrument, one instrument can be calibrated to another instrument. The calibration disk 100 is not degraded, worn, or damaged in any way by the calibration procedure.

Figure 8:
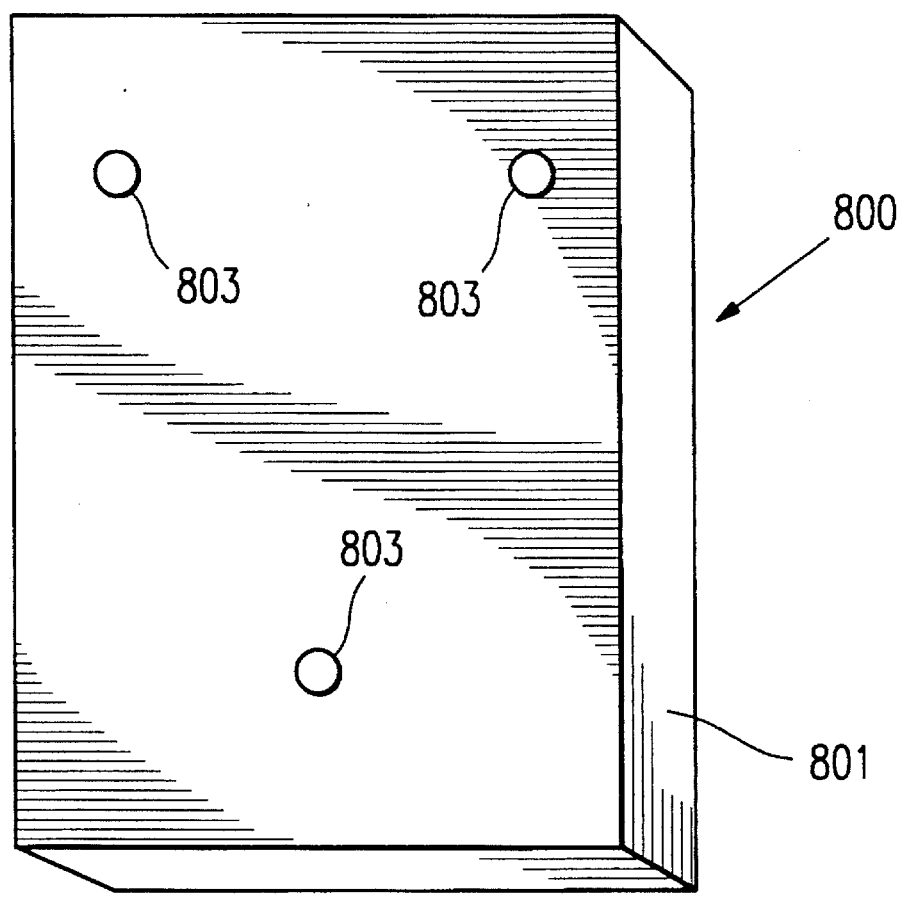
FIG. 8 is a perspective view of a calibration SFA in accordance with the present invention.
Figure 9:
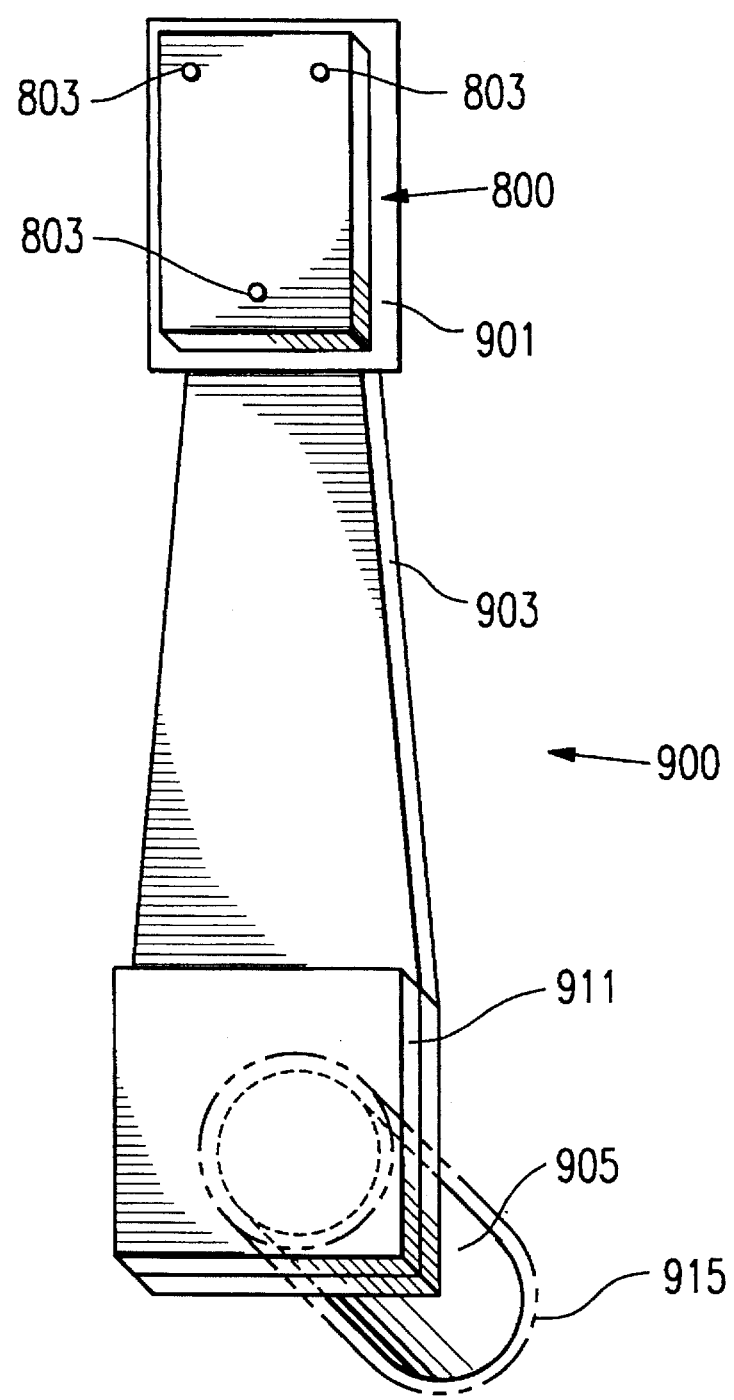
FIG. 9 is a perspective view of a calibration SFA in accordance with the present invention mounted on a load beam.

In an alternative embodiment of the present invention shown in FIGS. 8, 9, and 10, a conventional measurement disk 917 is used together with a static flying height calibration slider flexure assembly 900 ("calibration SFA"). The calibration SFA 900 includes a calibration slider 800 and flexure 901. FIG. 8 depicts a calibration slider 800 of a calibration SFA 900 in accordance with the present invention. The calibration slider 800 is preferably essentially a conventional 70% slider body, such as a slider for which the instrument is to be calibrated, having a dominant surface 801. However, for simplicity and economy, the calibration slider 800 preferably is not equipped with a recording core. Furthermore, the surface 801 of the calibration slider 800 is preferably lapped flat. Support structures are fabricated from a hard metal film which is preferably deposited on the essentially flat surface 801 of the calibration slider 800 in 3 discrete spots (or protrusions) 803 in a generally triangular pattern. Each such spot 803 rises from the surface 801 of the slider to a high point. The three high points of the support structures define a plane from which the surface of the slider 800 is a known measurable distance.

Figure 11:
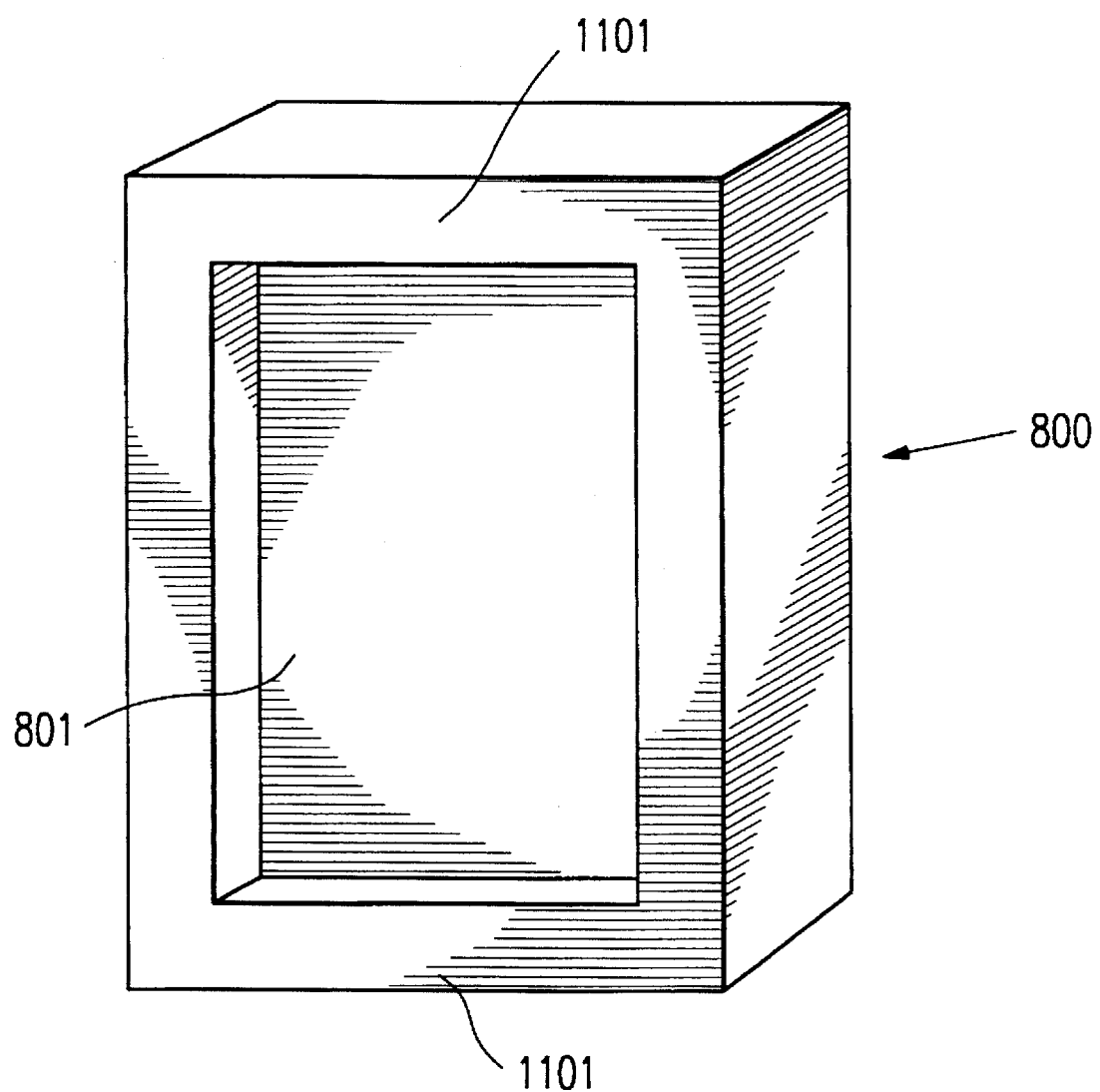
FIG. 11 is a perspective view of an alternative embodiment of a calibration SFA in accordance with the present invention.
Figure 12:
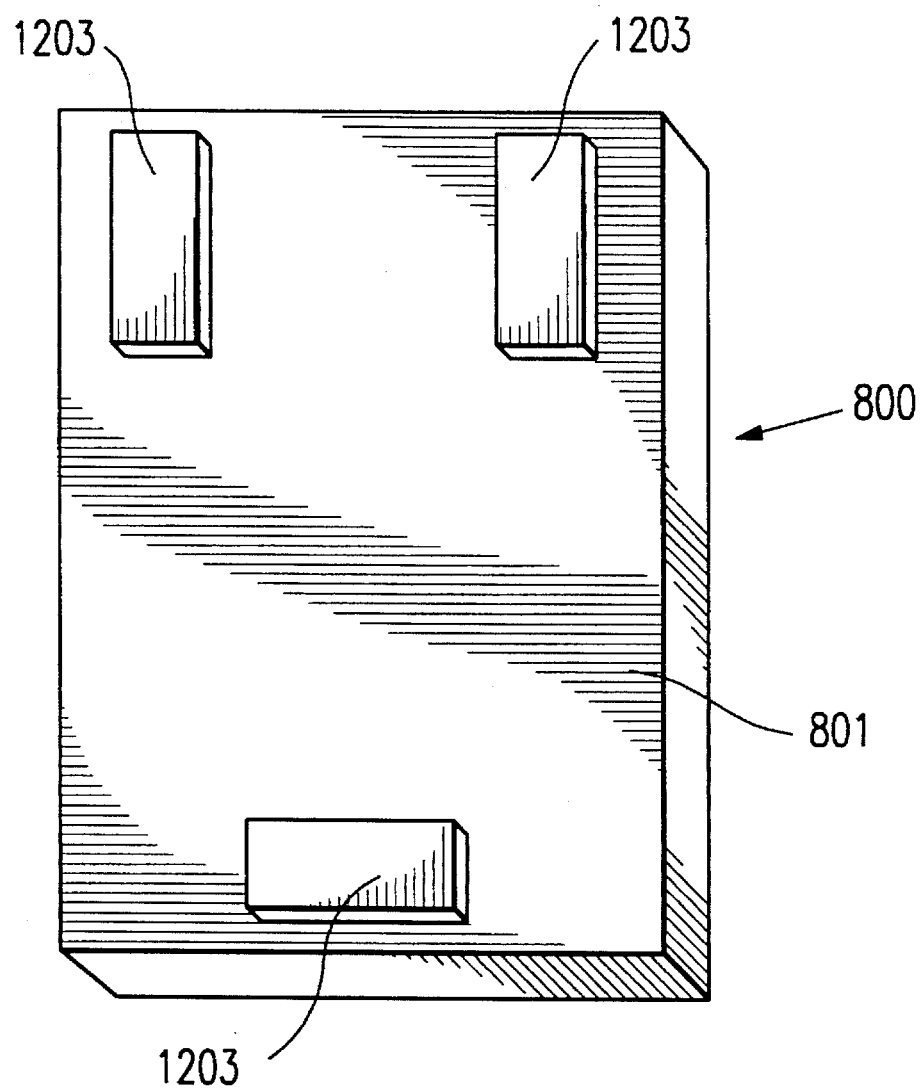
FIG. 12 is a perspective view of another alternative embodiment of a calibration SFA in accordance with the present invention.
Figure 13:
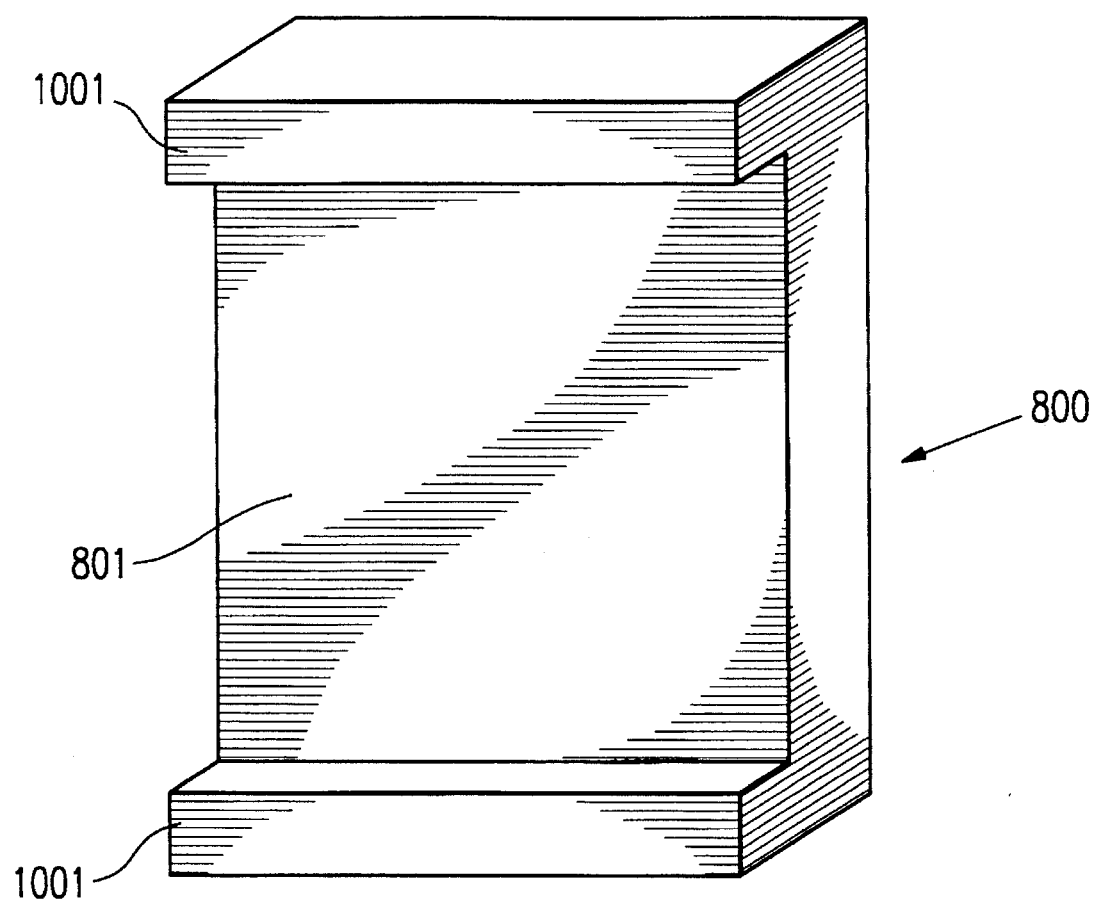
FIG. 13 is a perspective view of yet another alternative embodiment of a calibration SFA in accordance with the present invention.

In one embodiment of the present invention, chrome is sputtered onto the calibration slider 800 to form the spots 803, each having a high point that is approximately equal to the height at which a conventional slider, the flying height of which is to be measured by a conventional measurement apparatus 923, flies over a conventional disk surface. Alternatively, spots 803 of materials such as Aluminum, Copper, Iron, Nickel, or other non-refractory metals, or Tungsten, Titanium, Platinum, or other refractory metals can be applied by sputtering, evaporation, plating, chemical vapor deposition, reduction, chemical decomposition or other means. Providing the support structures in 3 discrete spots 803 is preferable, since such spots have a single high point which can be easily measured. Furthermore, such spots 803 may be more easily cleaned to prevent contamination which could alter the accuracy of the calibration. However, in an alternative embodiment of the present invention, the support structures may be formed in any configuration, such as, for example, a raised perimeter 1101, as shown in FIG. 11, at least one structure 1203 having a generally flat surface, as shown in FIG. 12, or two or more raised edges 1001, as shown in FIG. 13. Furthermore, many of the configuration for support structures taught with respect to a calibration disk would be appropriate as support structures of a calibration slider. It should be clear from these examples that there are many other configurations too numerous to state which could be used to support a calibration slider 800 above a measurement disk 917. Therefore, any other configuration which supports the dominant surface 801 of the calibration slider 800 above the surface of the measurement disk 917 while allowing an accurate measurement of the distance between the calibration slider 800 and the measurement disk 917 would be within the scope of the present invention. Thus, a conventional flying height measurement instrument may determine the distance between the surface 801 of the slider 800 and the surface of a measurement disk 917.

The calibration slider 800 is preferably mounted on a flexure 901 in a manner similar to that used to mount a conventional slider in a conventional disk drive. In one embodiment of the present invention, for example, the calibration slider 800 is bonded to the flexure 901 using a conventional ultraviolet epoxy.

Figure 10A:
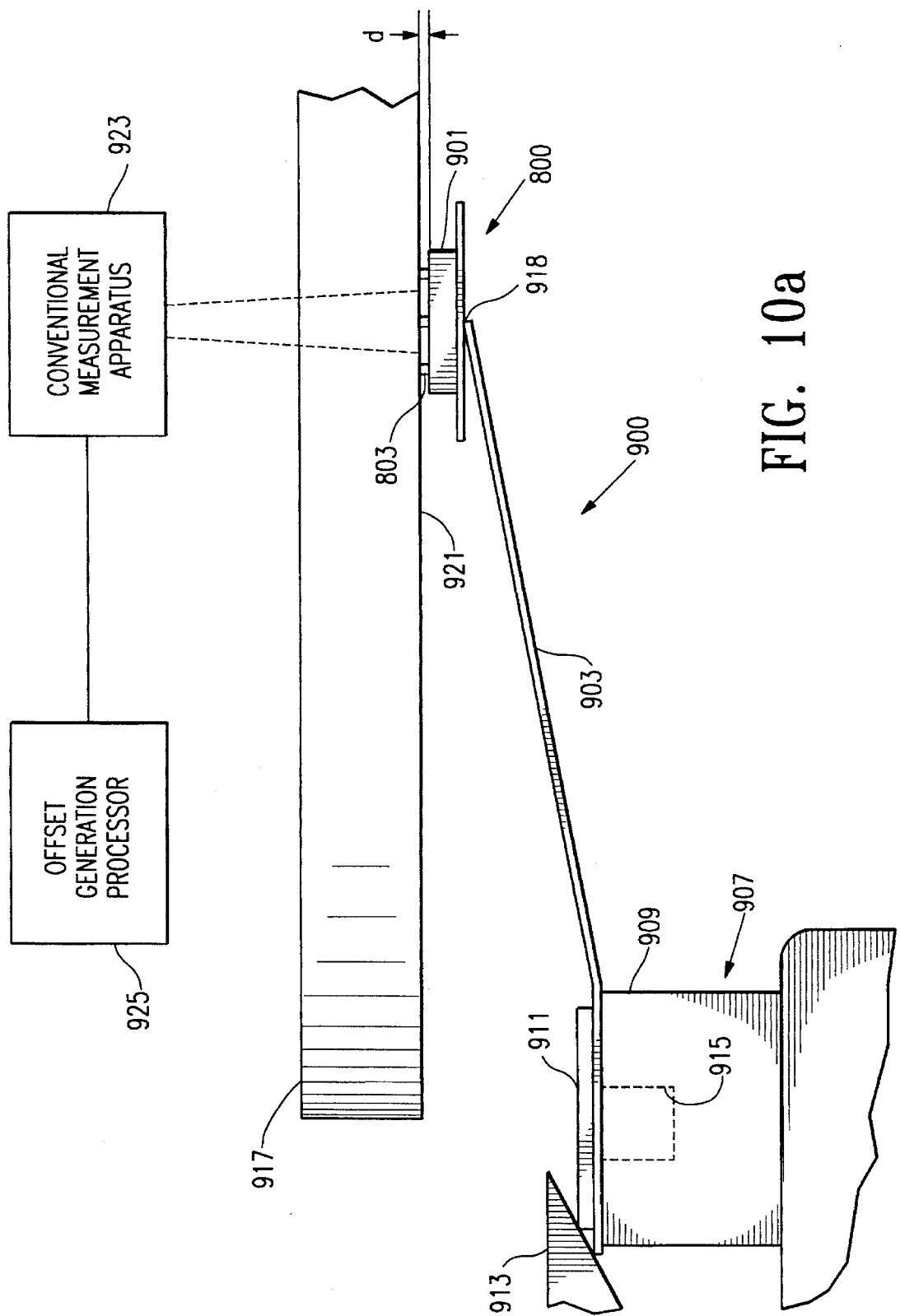
FIG. 10a is a side view of a calibration SFA in accordance with the present invention in contact with a transparent flying height measurement disk.
Figure 10B:
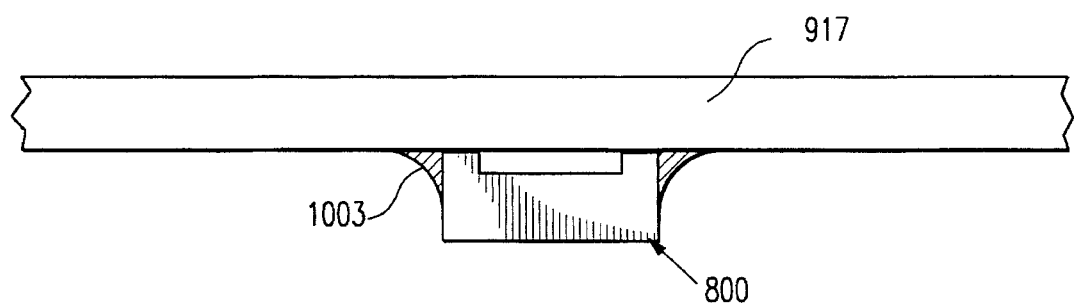
FIG. 10b is a side view of a calibration SFA in accordance with an alternative embodiment of the present invention in contact with a transparent flying height measurement disk.
Figure 10C:
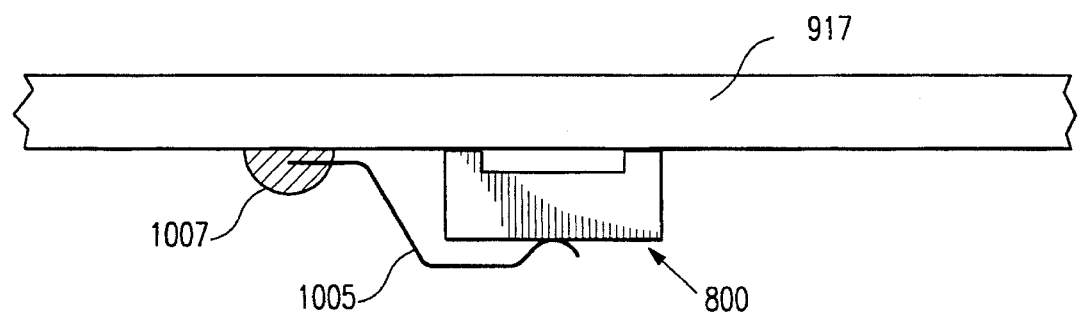
FIG. 10c is a side view of a calibration SFA in accordance with another alternative embodiment of the present invention in contact with a transparent flying height measurement disk.
Figure 10D:
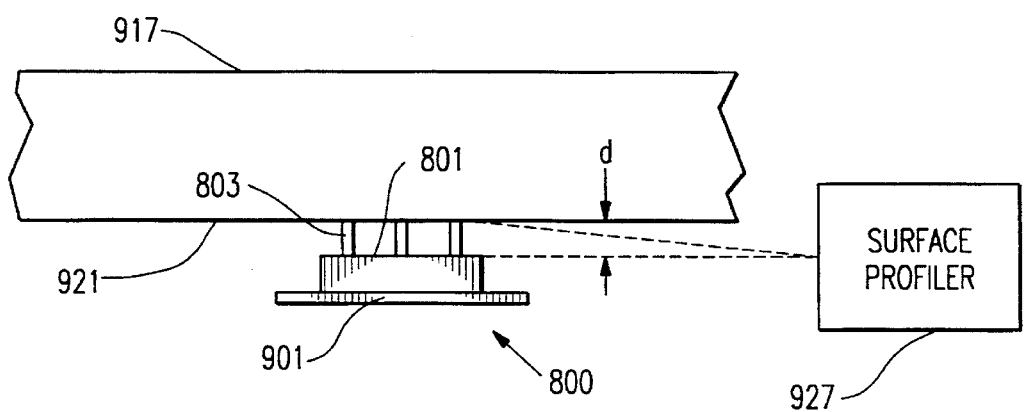
FIG. 10d is a side view of a calibration SFA in accordance with an alternative embodiment of the present invention in contact with a transparent flying height measurement disk.

Referring to FIGS. 9 and 10a, in the preferred embodiment of the present invention the calibration SFA 900 is coupled to a conventional part holder/clamp 907. The part holder/clamp consists of base 909 with hole 915, and clamp 913. The SFA assembly 900 consists of a load beam 903, a flexure 901, a mounting block 911, and a slider 800. The calibration SFA 900 is held into position relative to the disk 917 by the part holder/clamp 907. The calibration SFA 900 is mounted with the slider 800 at the distal end 918 of the load beam 903 using a gimbaling suspension system in a conventional manner, such that the calibration slider 800 is free to move about a number of axes of rotation, each of which intersect at the point that the flexure 901 is secured to the slider 800. Near the proximal end of the load beam 903 is the mounting block 911, having a mounting boss 905 which is inserted into hole 915 of part holder/clamp 907 for coupling the load beam 903 to the part holder/clamp 907. FIG. 10a shows the calibration SFA 900 mounted to the part holder/clamp 907. It should be understood that in accordance with the present invention, any means may be used to secure and position the calibration slider 800 on the measurement disk 917 as long as each of the three spots 803 are placed into positive contact with the disk. For example, in an alternative embodiment, the calibration slider 800 may be placed upon the disk 917 of the flying height measurement instrument and secured in contact therewith by mechanisms other than the load beam 903, such as an epoxy adhesive fillet 1003 that holds the perimeter of the slider 800 in position relative to the disk 917 (see FIG. 10b). In accordance with another possible embodiment of the invention, the slider is retained in position against the disk with a retaining clip 1005 (see FIG. 10c). The clip 1005 may be secured to the measurement disk 917 by epoxy 1007 or any means such as a screw, friction fit within a groove in the measurement disk 917, welded, etc.

As shown in FIG. 10a, the deposited spots 803 on the surface of the slider 800 ensure that the surface 801 of the slider 800 is spaced apart a known distance from a surface 921 of the measurement disk 917. The exact distance d between the flat surface 801 of the slider 800 and the surface 921 of the measurement disk 917 can be determined by measuring the exact height of the highest point of the deposited spots 803 off the surface 801 of the slider 800 in a conventional manner, such as by using a conventional DEKTAK surface profiler 927 manufactured by Sloan Instruments of Santa Barbara, Calif., or by an affect generation processor 925, such as a WYKO Topo-3D manufactured by WYKO Corporation of Tucson, Ariz. (see FIG. 10d).

The embodiment shown in FIGS. 8–10 has a number of advantages over both the prior art methods of determining flying height and the method illustrated in FIGS. 1–7. The slider 800 of the embodiment of FIGS. 8–10 contacts the measurement disk 917 at only three discrete points. The gimbaling suspension ensures that the three points each are in positive contact with the surface 921 of the measurement disk 917. In accordance with the present invention, it is possible to accurately measure the height of each such point. Therefore, the exact distance between the surface 801 of the calibration slider 800 and the surface 921 of the measurement disk 917 can be very accurately determined in an manner that is completely independent of, and redundant with, the method used by a conventional flying height measurement instrument. Thus, the measurement made by a conventional flying height measurement instrument can be calibrated (i.e., a calibration factor may be added or subtracted to the reading of the instrument) to remove any discrepancy between the actual distance d from the calibration slider 800 to the measurement disk 917 and the measured distance. Furthermore, because the deposited spots 803 on the calibration slider 800 are relatively small protrusions, it is relatively easy to ensure that the spots 803 are uncontaminated by dirt or other particles that may distort the calibration process. Still further, the same measurement disk 917 may be used to calibrate the flying height measurement instrument that is used to make actual flying height measurements. Thus, the accuracy of the calibration process is generally enhanced. Further, since the same material is used for both the calibration slider 800 and an actual slider, the calibration does not suffer from discrepancies between the reflectively of the calibration slider 800 and the actual slider. Another advantage of the calibration slider 800 and the associated method for calibrating a flying height measurement instrument is the cost of a calibration slider 800 with respect to the cost of a calibration disk or sliders which are destroyed during destructive testing, such as bump testing.

As is the case with the calibration disk 100, the calibration slider 800 is used with no relative motion between the measurement disk 917 and the calibration slider 800. Therefore, the process is non-destructive and allows the calibration slider to enjoy a relatively long life.

A number of embodiments of the present invention have been described. Nevertheless, it will be understood that various modifications may be made without departing from the spirit and scope of the invention. For example, with regard to the calibration disk 100, the calibration disk 100 can be dimensioned to accommodate various flying height measurement instruments for measuring the flying height of heads 103 that fly over disks of any size. Furthermore, the dimensions of the rails 105 can be altered to accommodate any size head 103 having any flying height. Still further, the height of each pair of rails 105 may vary at different points around the calibration disk 100, such that the flying height measurement instrument can be calibrated at a number of flying heights using the same calibration disk 100.

With regard to the calibration slider 800, the present invention may include using a number of calibration sliders 800, the spots 803 of each calibration slider 800 being of different heights to allow a calibration curve to be plotted. Furthermore, the spots 803 may be fabricated by any method and of any material that results in a rigid spacer between the calibration slider 800 and a measurement disk 917 of a calibration instrument. Still further, the calibration slider 800 may be made of materials other than those materials that are conventionally used to fabricate a conventional slider. However, in the preferred embodiment, the same material and surface finish treatment is used for the calibration slider 800 as is used for sliders whose flying height it is desirable to calibrate. Accordingly, the optical properties of spectral diffusion, refractive index (real and imaginary parts), reflection coefficient, color, and mechanical properties such as surface roughness, grain size, expansion coefficient, etc., would be eliminated as variables. In addition, any means may be used to position the calibration slider 800 on the measurement disk 917 of a flying height measurement disk 917, such that the flying height measurement instrument may measure the distance between the calibration slider 800 and the measurement disk 917. Furthermore, while the preferred embodiment of the present invention has three spots 803, alternative embodiments may have more than three spots 803. However, the exact height of each must be known and controlled to ensure that the slider 800 is secure to the measurement disk 917. Accordingly, it is to be understood that the invention is not to be limited by the specific illustrated embodiment, but only by the scope of the appended claims.

We claim:

1. A method for calibrating a flying height measurement instrument having a measurement disk, using a calibration slider having a dominant surface having at least three support structures apart sufficiently to support the calibration slider of the flying height measurement instrument, including the steps of:

(a) measuring the height of the each support structure of a calibration slider;

(b) installing a first calibration slider into the flying height measurement instrument;

(c) placing the first calibration slider on the measurement disk;

(d) measuring the distance between the dominant surface of the calibration slider and the surface of the measuring disk of the flying height measurement instrument;

(e) replacing the first calibration slider with a second calibration slider;

(f) measuring the distance between the dominant surface of the second calibration slider and the measurement disk;

(g) generating a map such that for a plurality of values output by the flying height measurement instrument during a dynamic measurement of a conventional slider, there is a corresponding value that is essentially equal to an actual distance between the conventional slider and the measurement disk.

2. A flying height measurement instrument calibration slider for calibrating a flying height measurement instrument, the slider including at least one support structure formed on the slider, the at least one support structure for spacing the calibration slider from a disk of the flying height measurement instrument during measurement of the separation between the calibration slider and the disk; wherein the calibration slider is devoid of a recording core, and wherein the calibration slider is coupled to a flexure and a beam to form a slider-flexure assembly (SFA), the SFA being adapted for coupling to a clamp assembly for securing and positioning the calibration slider on the disk, such that the calibration slider and the support structure are exposed to the ambient atmosphere during calibration of the flying height measurement instrument.

3. A flying height measurement instrument calibration slider for calibrating a flying height measurement instrument having a rotating measurement disk which causes a transducer head to be supported by a cushion of air, the flying height calibration slider including:

(a) an exposed body, devoid of a recording core, having a dominant surface and being sufficiently similar to the body of a slider, the flying height of which is to be measured, to allow a measurement technique used by a flying height measurement instrument to measure the height of the calibration slider over the measurement disk; and (b) at least one exposed support structure formed upon the dominant surface, such that the slider is supported by the structure a predetermined distance from the measurement disk, the exposed body and the exposed support structure being exposed to the ambient atmosphere when the exposed support structure is supporting the slider by the predetermined distance from the measurement disk and during calibration of the flying height measurement instrument.

4. The flying height measurement instrument calibration slider of claim 3, wherein the dominant surface is essentially smooth.

5. The flying height measurement instrument calibration slider of claim 3, wherein three support structures are included, each support structure having a clearly discernable high point and at least one of the support structures does not lie on a line with at least two other support structures.

6. The flying height measurement instrument calibration slider of claim 5, wherein the support structures are formed as protrusions.

7. The flying height measurement instrument calibration slider of claim 5, wherein the support structures are formed of chrome.

8. A flying height measurement instrument calibration slider for calibrating a flying height measurement instrument having a rotating measurement disk which causes a transducer head to be supported by a cushion of air, the flying height calibration slider including:

(a) an exposed body, devoid of a recording core, having a dominant surface and being sufficiently similar to the body of a slider, the flying height of which is to be measured, to allow a measurement technique used by a flying height measurement instrument to measure the height of the calibration slider over the measurement disk; and (b) at least one exposed support means formed upon the dominant surface, such that the slider is supported by the support means a predetermined distance from the measurement disk, the exposed body and the exposed support means being exposed to the ambient atmosphere when the exposed support means is supporting the slider by the predetermined distance from the measurement disk and during calibration of the flying height measurement instrument.

9. A flying height measurement instrument for measuring the flying height of a surface of a slider spaced apart from a disk, including:

(a) a measurement disk;

(b) at least one calibration slider devoid of a recording core, the calibration slider including a plurality of exposed support structures on the surface of the slider, at least a subset of the support structures placed in contact with the measurement disk, the exposed support structures being exposed to the ambient atmosphere when the subset of support structures contact the measurement disk and during calibration of the flying height measurement instrument; and (c) means for determining the distance of a surface of the calibration slider above the measurement disk;

whereby the height of the calibration slider above the measurement disk may be determined by measuring the high point of each support structure.

10. The flying height measurement instrument of claim 9, further including a load beam coupled to the calibration slider for holding the support structures of the calibration slider in contact with the measurement disk.

11. The flying height measurement instrument of claim 10, wherein the calibration slider is gimbled such that at least three high points of the support structure contact the measurement disk.

12. A method for calibrating a flying height measurement instrument having a measurement disk, using a calibration slider having at least three support structures spaced apart on a surface of the calibration slider sufficiently to support the calibration slider above the measurement disk of the flying height measurement instrument, including the steps of:

(a) measuring the height of the high point of each support structure calibration slider above the surface of the calibration slider;

(b) contacting at least three of the support structures of the calibration slider with a surface of the measurement disk;

(c) exposing the calibration slider and the support structures to the ambient atmosphere when the support structures are contacting the measurement disk and during steps (d) and (e);

(d) measuring the distance between surface of the calibration slider and the surface of the measurement disk with the flying height measurement instrument; and (e) comparing the output of the flying height measurement instrument to the distances measured in step a to determine an offset value.

13. The method for calibrating a flying height measurement instrument of claim 12, further including the steps of;

(a) installing a second slider on the flying height measurement instrument;

(b) flying the second slider over the measurement disk by rotating the measurement disk;

(c) measuring the separation distance of the second slider;

(d) applying the offset value to the output of the flying height measurement instrument to determine the true flying height of the second slider over the measurement disk.

* * * * *